United States Patent [19]
Haferl

[11] Patent Number: 5,402,044
[45] Date of Patent: Mar. 28, 1995

[54] RASTER DISTORTION AVOIDANCE ARRANGEMENT

[75] Inventor: Peter E. Haferl, Adliswil, Switzerland

[73] Assignee: RCA Thomson Licensing Corporation, Princeton, N.J.

[21] Appl. No.: 70,824

[22] Filed: Jun. 3, 1993

[30] Foreign Application Priority Data

Sep. 11, 1992 [GB] United Kingdom ............... 9223447

[51] Int. Cl.⁶ ............................................. H01J 29/56
[52] U.S. Cl. ..................................... 315/371; 315/408
[58] Field of Search ....................... 315/370, 371, 408

[56] References Cited

U.S. PATENT DOCUMENTS

| | | |
|---|---|---|
| 3,962,603 | 6/1976 | Van Der Vegt . |
| 4,019,093 | 4/1977 | Klein . |
| 4,238,714 | 12/1980 | Sumi . |
| 4,612,481 | 9/1986 | Storberg . |
| 4,707,640 | 11/1987 | Onozawa et al. ............ 315/408 |
| 5,182,504 | 1/1993 | Haferl . |

Primary Examiner—Theodore M. Blum
Attorney, Agent, or Firm—Joseph S. Tripoli; Joseph J. Laks; Sammy S. Henig

[57] ABSTRACT

Organ pipes distortions, caused by parasitic ringing in a horizontal deflection current are suppressed by forming a current pulse in a current injection arrangement. The current pulse is coupled to a junction terminal between a terminal of the horizontal deflection winding where a high retrace pulse voltage is developed and a low voltage terminal of a linearity correction inductance. A high voltage terminal of the linearity correction inductance is coupled to a horizontal output transistor. The current pulse begins prior to the end of retrace and ends during the trace interval. A modulation network is coupled across the linearity correction inductance for providing a low impedance current path to the current pulse.

13 Claims, 4 Drawing Sheets

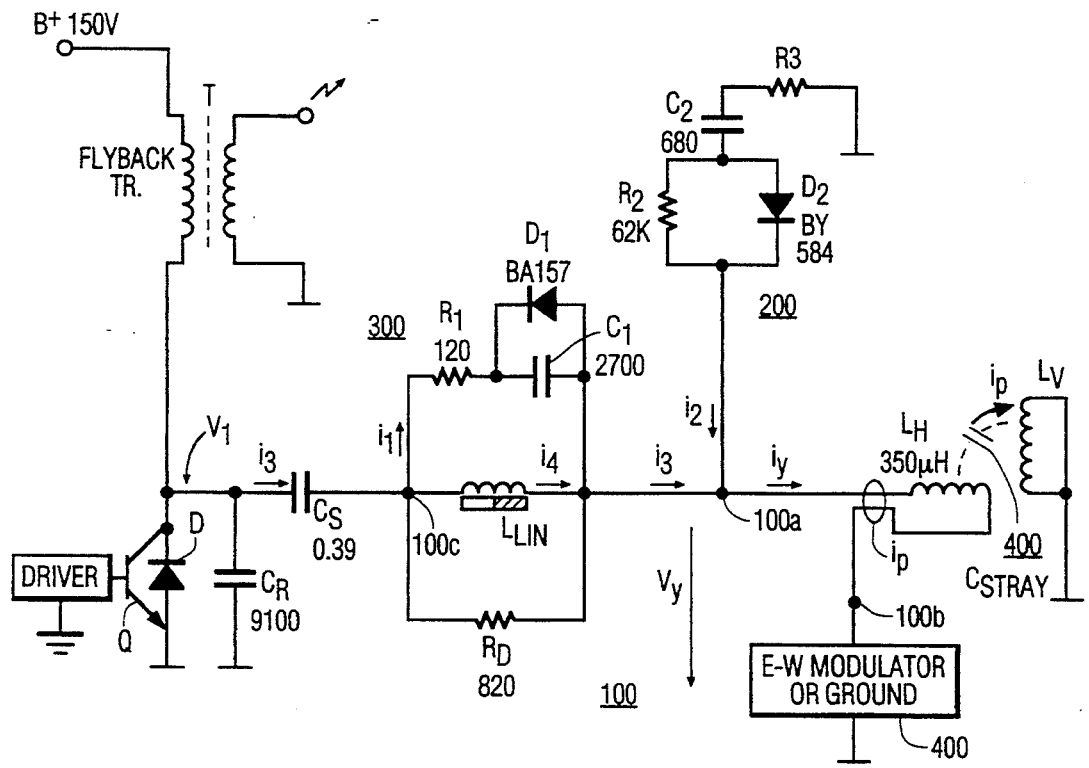
FIG. 1
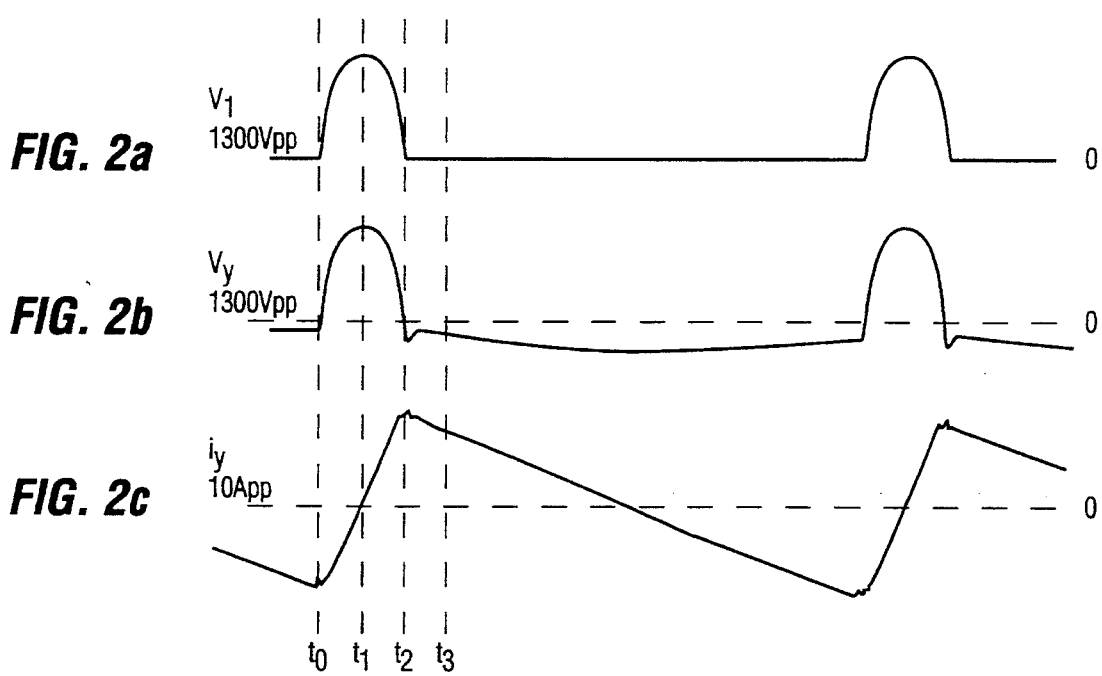
FIG. 2a
FIG. 2b
FIG. 2c

RASTER DISTORTION AVOIDANCE ARRANGEMENT

The invention relates to a deflection circuit of a video display apparatus.

So-called "organ pipes" distortion may appear in the left-hand side of a display screen of a cathode ray tube (CRT) as brightness modulated, vertical stripes. This type of distortion may result from horizontal deflection current ringing that produces a beam velocity modulation visible as vertical stripes. The deflection current ringing may be caused by a stray or parasitic capacitance, associated with windings of a horizontal deflection winding, immediately after a retrace voltage pulse that is developed across the horizontal deflection winding ceases.

The high rate of change of a retrace voltage pulse that is developed across the deflection winding, during the second half of horizontal retrace, produces a capacitive current pulse flowing in the horizontal deflection winding. This capacitive current pulse ends abruptly at the end of horizontal retrace, when the rate of change of the retrace voltage pulse becomes zero and may produce the deflection current ringing and deflection nonlinearity at the beginning of trace.

Organ pipes distortions may last, for example, 5 μs after the beginning of the trace interval. The effect of organ pipes distortion or deflection nonlinearity at the beginning of trace is not visible to the user when a high degree of overscan is used. Overscan reduces the light output of the picture tube. The decrease in brightness is proportional to the required overscan and is between 6% and 8% when the horizontal frequency is $1 \times f_H$ and up to 12% when it is $2 \times f_H$, where $f_H = 15,265$ Hz. Reducing overscan may be desirable when using large picture tubes. These generally suffer lack of brightness. However, reduction of overscan requires maintaining acceptable deflection linearity at the start of trace. It may be desirable to operate CRTs with only a low degree of overscan.

Color television receivers or display monitors operating at higher scan rates than, for example, $f_H = 15,625$ Hz, may be even more susceptible to organ pipes distortions. The ringing depends upon the horizontal winding stray capacitance and the retrace pulse voltage width and amplitude and not upon the deflection frequency. When a higher deflection frequency is used, the trace interval is shorter. Therefore, the ringing interval is proportionally greater relative to the trace interval. It may be desirable to suppress the deflection current ringing and maintain deflection linearity during the beginning of horizontal trace without using a high degree of overscan.

U.S. Pat. No. 5,182,504 (the Haferl patent) describes a horizontal deflection circuit in which a linearity correcting coil is coupled between a deflection switch and the horizontal deflection winding. A current pulse is injected by a current injection network at a junction terminal between the horizontal deflection winding and the linearity correcting coil, during the end of retrace and at the beginning of trace. The injected current compensates for the sudden decrease in the stray or parasitic capacitance current. In this way, the deflection current ringing is prevented. It may also be desirable to further reduce nonlinearity distortion in the deflection current caused by the parasitic capacitance current at the beginning of trace.

In accordance with an inventive feature, a modulation network is parallel-coupled to the linearity coil and provides a low impedance to the current injection network to enable injection of a narrow current pulse during the retrace-to-trace transition. The current pulse is injected to the junction of the horizontal deflection winding and the linearity coil. The current pulse opposes the parasitic effects of the winding stray capacitance for suppressing ringing of the deflection current and improve deflection linearity.

A video display deflection apparatus, embodying an aspect of the invention, includes a deflection winding and a retrace capacitance coupled to the deflection winding to form a retrace resonant circuit. A switching arrangement produces a deflection current and a retrace pulse voltage in the deflection winding. An inductance is coupled in a current path of the deflection current between the deflection winding and the switching arrangement. A pulse of current is generated and coupled to the current path via a junction terminal between the inductance and the deflection winding. The current pulse has both a beginning time and an end time in a vicinity of an instant when the retrace pulse voltage ceases. An arrangement coupled to the terminal narrows the pulse of current.

FIG. 1 illustrates a horizontal deflection circuit with a ringing suppression network and a modulation network, embodying an aspect of the invention;

FIGS. 2a–2c illustrate waveforms obtained in the circuit of FIG. 1 when both the ringing suppression and modulation networks of the arrangement of FIG. 1 are removed;

Figure 3A:
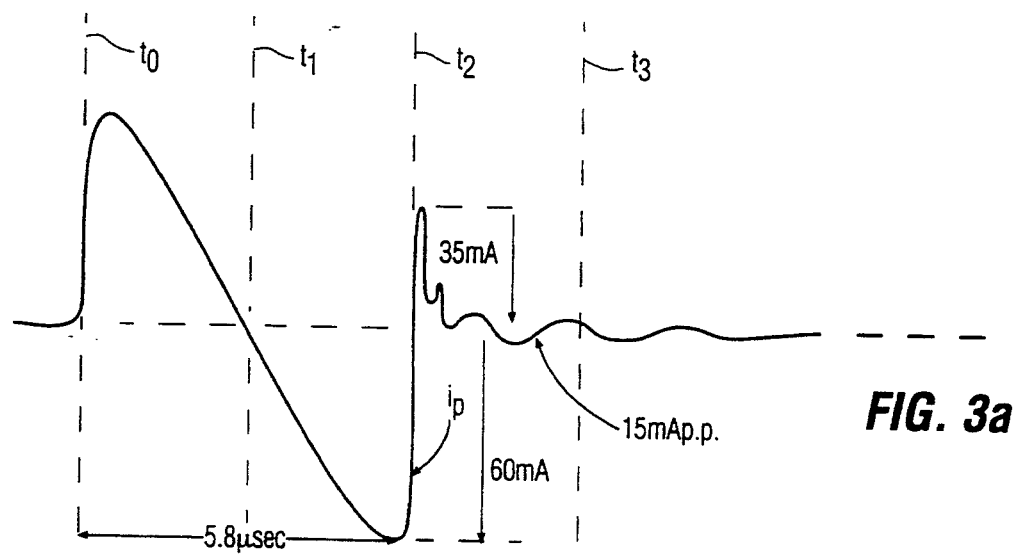
FIGS. 3a–3c illustrate additional waveforms obtained in the circuit of FIG. 1 when both the ringing suppression and modulation networks of FIG. 1 are removed.

FIG. 1 illustrates a horizontal deflection circuit 100, embodying an aspect of the invention, operating at twice the horizontal frequency $f_H$, where $f_H = 15,625$ Hz. Deflection circuit 100 includes a flyback transformer T, a deflection switching transistor Q, a damper diode D, a retrace capacitor $C_R$, an S-shaping capacitor $C_S$, a linearity coil $L_{Lin}$ with a parallel coupled damping resistor $R_D$ and a horizontal deflection winding $L_H$. Linearity coil $L_{Lin}$ is coupled between winding $L_H$ and transistor Q. A conventional East-West raster correction circuit 400 is coupled to an end terminal 100b of winding $L_H$ that is remote from linearity coil $L_{Lin}$.

As shown adjacent to winding $L_H$, a stray or interwinding capacitance $C_{STRAY}$ is associated with the windings of winding $L_H$. Stray capacitance $C_{STRAY}$ is formed between horizontal deflection winding $L_H$ and, for example, a vertical deflection winding LV, a yoke ferrite core, not shown, and/or other components in the vicinity.

In operation, a ringing suppression network 200 is coupled to a junction terminal 100a, between coil $L_{Lin}$ and winding $L_H$. Additionally, a current modulation network 300, embodying an aspect of the invention, is coupled across linearity coil $L_{Lin}$.

For explanation purposes only, assume that networks 200 and 300 are disconnected from terminal 100a and resistor $R_D$ has a value of 200 Ohms to form a deflection circuit that operates in a conventional manner. FIGS. 2a–2c illustrate waveforms useful for explaining how Organ Pipes distortions are produced when networks 200 and 300 are disconnected. Similar symbols and numerals in FIGS. 1 and 2a–2c indicate similar items or functions.

As a result of the switching operation of transistor Q of FIG. 1, a retrace voltage V1 of FIG. 2a is developed across deflection transistor Q of FIG. 1. A retrace voltage Vy of FIG. 2b is developed across winding $L_H$ of FIG. 1. FIG. 2c illustrates a deflection current iy that flows in a current path of winding $L_H$ of FIG. 1.

Figure 3B:
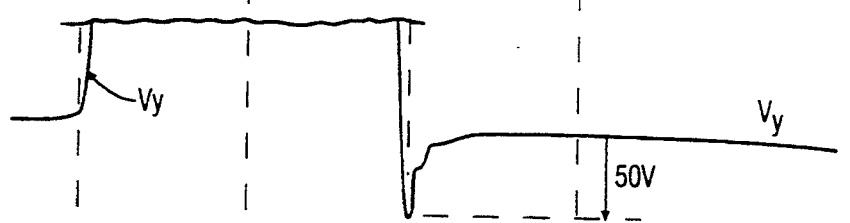
Figure 3C:
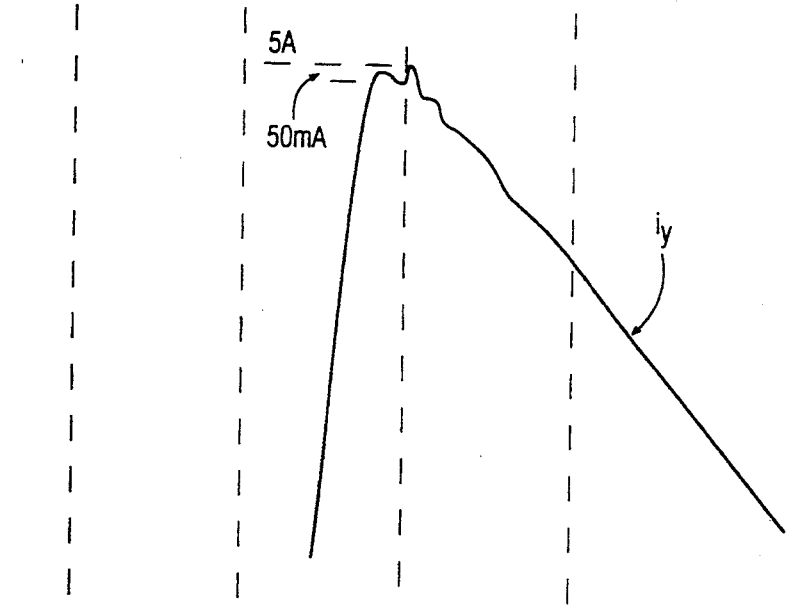

For explanation purposes, a time t0 of FIG. 2c indicates the start of retrace, a time t1 indicates the center of retrace, a time t2 indicates the start of trace and a time t3 indicates an instant after the start of trace such that intervals t0–t1, t1–t2 and t2–t3 have equal lengths. Parasitic or stray yoke capacitance $C_{STRAY}$ of FIG. 1 causes ringing of the yoke current iy of FIG. 2c at times t0 and t2. Retrace voltage Vy of FIG. 2b overshoots at time t2. A more detailed illustration of the waveforms is shown in FIGS. 3a–3c. Similar symbols and numerals in FIGS. 1, 2a–2c and 3a–3c indicate similar items or functions.

A stray capacitance current ip of FIG. 3a in stray capacitance $C_{STRAY}$ of FIG. 1 has its highest amplitude where the rate of change of voltage Vy of FIG. 3b is highest, at times t0 and t2. Current ip can be measured using an appropriate current probe. In a Philips saddle-saddle yoke 400 shown in FIG. 1, that is mounted on a Philips picture tube A66AEK220X43 used in flickerfree CTV receivers, stray capacitance $C_{STRAY}$ is equal to 150 pF. The rate of change of voltage Vy changes from a high value to a low value at time t2 of FIG. 3b, causing current ip of FIG. 3a to become zero. Current ip is negative prior to time t2 and reduces current iy. As a result, current iy increases at time t2 of FIG. 3c. The fast increase in current iy produces ringing of current iy of FIG. 3c and overshoot and ringing of voltage Vy of FIG. 3b and also of current ip of FIG. 3a. The ringing produces an image distortion that is similar to organ pipes. Ringing suppression network 200 of FIG. 1, reduces such ringing. Network 200 includes a series arrangement of a resistor R3, a capacitor C2 and a parallel arrangement that includes a resistor R2 and a switching diode D2. Linearity coil $L_{Lin}$ is interposed between deflection transistor Q and winding $L_H$ for separating winding $L_H$ from transistor switch Q. Linearity coil $L_{Lin}$ is non-saturated at the beginning of trace having an inductance of about 10%–20% of the inductance of winding $L_H$.

FIGS. 4a–4d illustrate waveforms useful for explaining the operation of the circuit of FIG. 1 when network 200 is included in the circuit, but when network 300 is disconnected in a way similar to that shown in the Haferl patent. Similar symbols and numerals in FIGS. 1, 2a–2c, 3a–3c and 4a–4d indicate similar items or functions. In FIGS. 4a–4d, the amplitude and the time base scales are expanded relative to those of FIGS. 2a–2c.

Figure 4A:
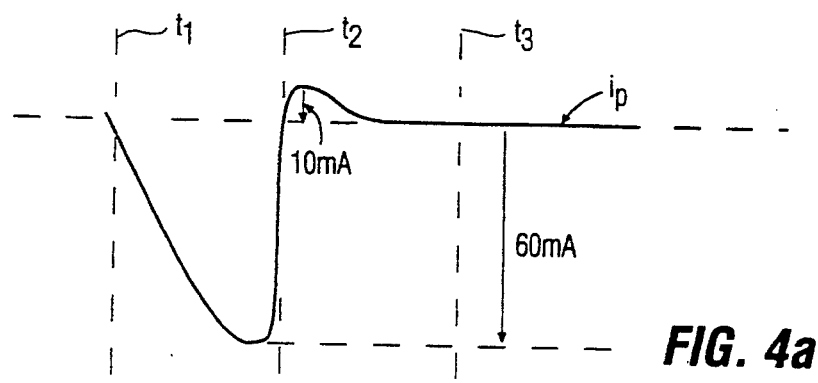
FIGS. 4a–4d illustrate waveforms obtained in the circuit of FIG. 1 when the modulation network is removed and the ringing suppression network is installed.
Figure 4B:
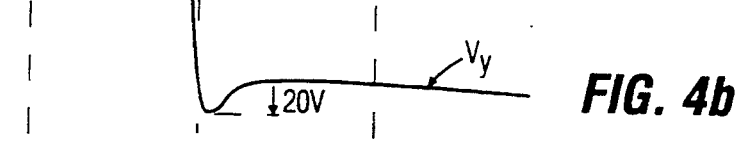
Figure 4C:
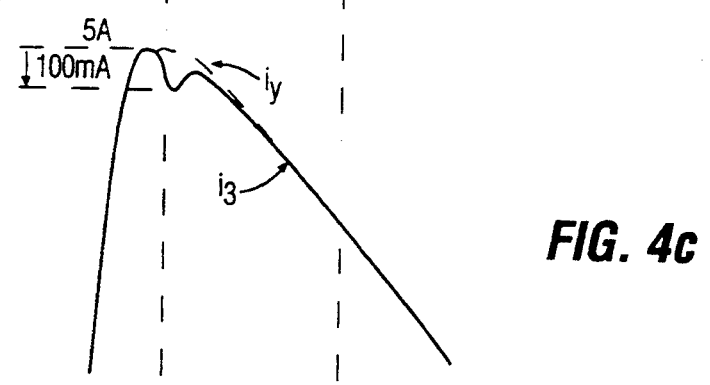
Figure 4D:
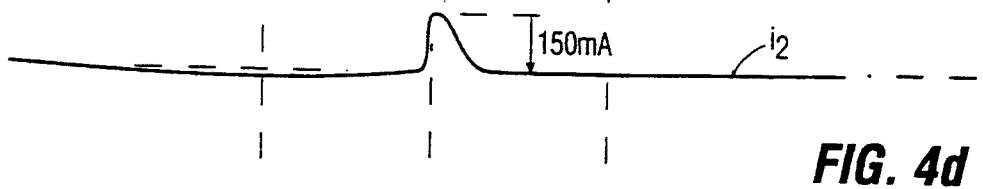

Capacitor C2 of FIG. 1 is charged during retrace via resistors R2 and R3 to a voltage determined by the value of resistor R2. Just before time t2 of FIG. 4d, capacitor C2 of FIG. 1 starts to discharge via resistor R3 and diode D2, generating a pulse of an injection current i2. Current i2 of FIG. 4d has a fast rise time, reaches the peak amplitude at time t2 and has a slow fall time. Current i2 is divided into a smaller, first portion current that is included in current iy and into a larger, second portion current that is included in current i3 of FIG. 1, according to the relative impedances in the current paths. The major portion of current i2, or about 80%–90%, flows through linearity coil $L_{Lin}$ having a lower impedance. As a result, current i2 generates a decrease of current i3 at time t2 as shown by FIG. 4c. The decrease in current i3 dampens the tendency of current iy to increase fast at time t2 of FIG. 4c, when current ip of FIG. 4a decreases. The result is a slower fall time of current ip and an effective damping of the ringing.

Without network 300, the pulse-width of pulse current i2 may be large. The result is that excessive magnitude of current iy may be produced at the start of trace, during interval t2–t3 of FIG. 4c. The excessive magnitude of the portion of the waveform of current iy in FIG. 4c shown in broken line causes deflection non-linearity at the start of trace. The excessive amplitude of current iy may produce deflection nonlinearity and overshoots in voltage Vy of FIG. 4b and in current ip of FIG. 4a. Without network 300 of FIG. 1, deflection current iy of FIG. 4c reaches its nominal value only at time t3 after which currents i3 and iy are equal.

Network 300, embodying an inventive feature, includes a resistor R1 coupled in series with a parallel arrangement of a diode D1 and a capacitor C1. FIGS. 5a–5d illustrate waveforms useful for explaining the operation of the deflection circuit of FIG. 1 when both networks 200 and 300 are included and functional. Similar symbols and numerals in FIGS. 1, 2a–2c, 3a–3c, 4a–4d and 5a–5e indicate similar items or functions. Advantageously, network 300 of FIG. 1 provides a low impedance current path for injection current i2.

Current i3 of FIG. 1 splits into a first portion, current i1 flowing through network 300, a second portion, a current i4 flowing in linearity coil $L_{LIN}$ and a negligible current flowing in resistor $R_D$. Increasing current i3 of FIG. 5a drives linearity coil $L_{Lin}$ of FIG. 1 out of saturation, during the first half of interval t1–t2 of FIG. 5a. After time t1 of FIG. 5a, a voltage proportional to the rate of change of current i4 is developed across linearity coil $L_{Lin}$ of FIG. 1 that generates current i1 of FIG. 5e. Current i1 of FIG. 1 charges capacitor C1 until current i1 of FIG. 5e becomes zero. The voltage across linearity coil $L_{Lin}$ of FIG. 1 decreases and becomes zero at time t2. The decrease in the voltage across coil $L_{Lin}$ of FIG. 1 causes capacitor C1 to begin discharging and current i4 of FIG. 5a to increase. Thus, current i1 modulates current i4 and causes the ratio between currents i4 and iy to increase prior to time t2. As a result, immediately prior to time t2, the difference between the peak amplitude of current i4 and current iy is larger than during trace. Injected current i2 of FIGS. 1 and 5b adds to current i1 of FIG. 1 and causes a fast discharge of capacitor C1 until diode D1 starts conducting.

Figure 5A:
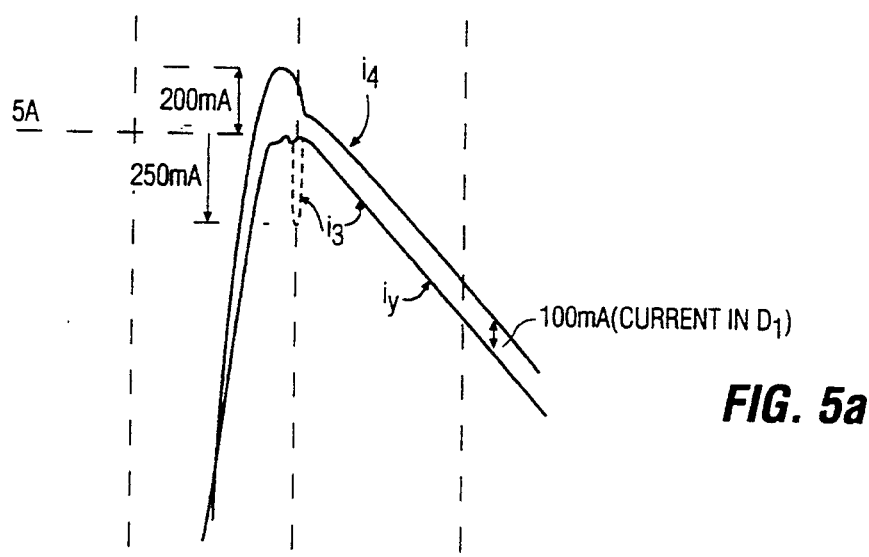
FIGS. 5a–5e illustrate waveforms obtained in the circuit of FIG. 1 when both the ringing suppression and modulation networks are installed.

Because of the low impedance path formed by network 300, a greater portion of pulse current i2 flows in network 300 than in coil $L_{Lin}$. Because of the low impedance formed by network 300, pulse current i2 of FIG. 5b becomes narrow, for example, 0.2 microseconds. Therefore, advantageously, excessive current iy at time t2 of FIG. 5a is prevented. Thus, proper deflection linearity is provided at the start of trace.

Figure 5B:
Figure 5C:
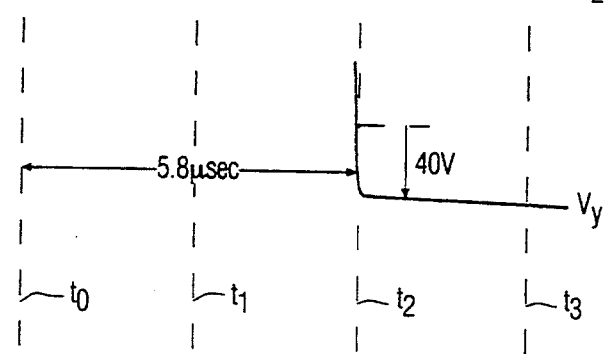
Figure 5D:
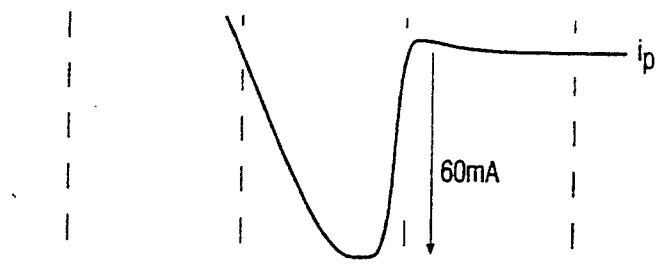
Figure 5E:
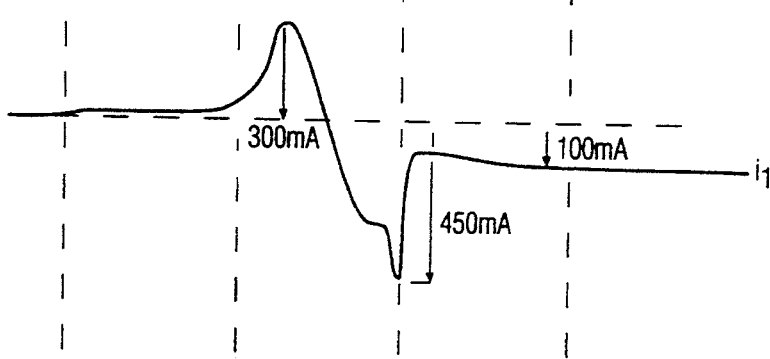

The fast decrease in current i4 of FIG. 5a in the vicinity of time t2 is produced by the corresponding change in current i1 of FIG. 5e. Current i1 of FIG. 5e generates across linearity coil $L_{LIN}$ of FIG. 1 a voltage which is positive on the side of terminal 100a. Advantageously, this voltage prevents overshoot of voltage Vy of FIG. 5c. The result is that ringings and deflection nonlinearity are prevented.

The difference between the amplitude of current i4 of FIG. 5a and current iy at time t2 is larger than during trace. Advantageously, the gradient of current i4 of FIG. 5a is not affected significantly by the injected current i2 of FIG. 5b. The result is that overshoot of voltage Vy of FIG. 5c and excessive amplitude of deflection current iy of FIG. 5a does not occur at start of trace.

During trace, diode D1 bypasses capacitor C1 and prevents parasitic oscillations. Current i3 differs from current iy of FIG. 5a only during the injection interval, when pulse current i2 of FIG. 5b is produced.

A deflection circuit similar to that shown in FIG. 1 can be used for a saddle-toroid yoke mounted on a video color picture tube W86EDL093X101 with the inductance of winding $L_H$ being equal to 350 μH and with the horizontal frequency being $2f_H$. Stray capacitance $C_{STRAY}$ is equal to 47 pF. In such circuit, the value of the following component values are modified as follows: C1=1800 pF, R1=120 Ohms, R2=72 k and C2=500 pF. The component values depend on the linearity coil, the circuit lay-out, the retrace time, the retrace voltage and the type of East-West raster correction. If a diode modulator is used for East-West pincushion correction, fine tuning of the bridge coil may be desirable to avoid parasitic oscillations at the low side of the yoke. East-West pincushion correction may be obtained, advantageously, using a circuit shown in U.S. Pat. No. 5,115,171, entitled RASTER DISTORTION CORRECTION CIRCUIT, in the name of P. E. Haferl.

What is claimed is:

1. A video display deflection apparatus comprising:
   a deflection winding;
   a retrace capacitance coupled to said deflection winding to form a retrace resonant circuit;
   first switching means coupled to said deflection winding for producing a deflection current and a retrace pulse voltage therein;
   an inductance coupled in a current path of said deflection current between said deflection winding and said first switching means;
   means for generating a pulse of current that is coupled to said current path via a junction terminal between said inductance and said deflection winding having both a beginning time and an end time that are closer to an instant when said retrace pulse voltage ceases than to an instant when said retrace pulse voltage begins; and
   an impedance coupled to said terminal for modulating a current in said inductance to form a low impedance current path such that a greater portion of said current pulse flows in said impedance and bypasses said inductance.

2. An apparatus according to claim 1 wherein said pulse of current is AC-coupled to said junction terminal between said inductance and said deflection winding.

3. An apparatus according to claim 1 wherein said inductance comprises a linearity correction inductance.

4. An apparatus according to claim 1 wherein said pulse of current generating means comprises a first resistor and a second capacitor coupled in series and wherein said impedance comprises a second resistor and a third capacitor coupled in series to form a series arrangement that is coupled across said inductance.

5. An apparatus according to claim 4 further comprising, a first diode coupled across said third capacitor.

6. An apparatus according to claim 4 further comprising, a second diode coupled between said second capacitor and said junction terminal.

7. An apparatus according to claim 6 further comprising, a second resistor coupled in parallel with said second diode.

8. An apparatus according to claim 1 wherein said impedance substantially reduces a pulse-width and increases an amplitude of said current pulse.

9. A video display deflection apparatus comprising:
   a deflection winding;
   a retrace capacitance coupled to said deflection winding to form retrace resonant circuit;
   first switching means coupled to said deflection winding for producing a deflection current and a retrace pulse voltage therein;
   an inductance coupled in a current path of said deflection current between said deflection winding and said first switching means;
   means for generating a pulse of current that is coupled to said current path via a junction terminal between said inductance and said deflection winding having both a beginning time and an end time that are closer to an instant when said retrace pulse voltage ceases than to an instant when said retrace pulse voltage begins; and
   means coupled to said inductance for modulating a current that flows in said inductance such that a ratio between said deflection current and said inductance current changes, during retrace, prior to the occurrence of said current pulse.

10. An apparatus according to claim 9 wherein the amplitude of said inductance current is substantially higher than the amplitude of said deflection current at the beginning of said pulse of current and said inductance current decreases during the occurrence of said pulse of current to an amplitude that remains afterwards higher than the amplitude of said deflection current.

11. An apparatus according to claim 9 wherein said inductance comprises a saturable linearity correction coil and wherein the current in said inductance remains at a higher amplitude than the amplitude of said deflection current after the occurrence of said pulse of current until said saturable linearity correction coil reaches saturation.

12. An apparatus according to claim 9 wherein said modulation means comprises a parallel arrangement of a capacitor and a diode to which a resistor is coupled in series to form a series arrangement that is coupled across said inductance.

13. A video display deflection apparatus comprising:
   a deflection winding;
   a retrace capacitance coupled to said deflection winding to form a retrace resonant circuit;
   first switching means coupled to said deflection winding for producing a deflection current and a retrace pulse voltage therein;
   an inductance coupled in a current path of said deflection current between said deflection winding and said first switching means;
   means for generating a pulse of current that is coupled to said current path via a junction terminal between said inductance and said deflection winding having both a beginning time and an end time that are closer to an instant when said retrace pulse voltage ceases than to an instant when said retrace pulse voltage begins; and
   means coupled to said terminal for narrowing said pulse of current.

* * * * *